(12) United States Patent
Doyle

(10) Patent No.: US 11,817,598 B2
(45) Date of Patent: Nov. 14, 2023

(54) GANG VENT CAP

(71) Applicant: Doyle Manufacturing, Inc., Holland, OH (US)

(72) Inventor: Michael A. Doyle, Holland, OH (US)

(73) Assignee: DOYLE MANUFACTURING, INC., Holland, OH (US)

( * ) Notice: Subject to any disclaimer, the term of this patent is extended or adjusted under 35 U.S.C. 154(b) by 166 days.

(21) Appl. No.: 17/176,716

(22) Filed: Feb. 16, 2021

(65) Prior Publication Data

US 2021/0167459 A1 Jun. 3, 2021

Related U.S. Application Data

(60) Continuation of application No. 16/862,797, filed on Apr. 30, 2020, now Pat. No. 10,957,889, which is a division of application No. 15/606,417, filed on May 26, 2017, now Pat. No. 10,680,220.

(60) Provisional application No. 62/344,443, filed on Jun. 2, 2016.

(51) Int. Cl.
*H01M 50/308* (2021.01)

(52) U.S. Cl.
CPC ........... *H01M 50/308* (2021.01); *Y02E 60/10* (2013.01)

(58) Field of Classification Search
CPC ............................ H01M 50/308; Y02E 60/10
See application file for complete search history.

(56) References Cited

U.S. PATENT DOCUMENTS

| | | | | |
|---|---|---|---|---|
| 4,477,542 A | * | 10/1984 | Braswell | H01M 50/147 429/87 |
| 2013/0034756 A1 | * | 2/2013 | Doyle | H01M 50/308 429/87 |

* cited by examiner

*Primary Examiner* — Lingwen R Zeng
(74) *Attorney, Agent, or Firm* — Shumaker, Loop & Kendrick, LLP; James D. Miller

(57) ABSTRACT

A battery vent cap gang includes a plurality of vent caps. A primary member is operably coupled to each of the plurality of vent caps. A first translation member is operably coupled to a first one of the plurality of vent caps and spaced from the primary member in a first direction. A second translation member is operably coupled to a second one of the plurality of the vent caps and spaced from the primary member in a second direction. An actuator is operably coupled to the primary member, the first translation member, and the second translation member to cause substantially simultaneous rotational movement of the plurality of vent caps.

17 Claims, 5 Drawing Sheets

GANG VENT CAP

CROSS-REFERENCE TO RELATED PATENT APPLICATION

This is a continuation patent application of U.S. patent application Ser. No. 16/862,797 filed on Apr. 30, 2020 which is a divisional patent application of U.S. patent application Ser. No. 15/606,417 filed May 26, 2017 which claims the benefit of U.S. Provisional Patent Application Ser. No. 62/344,443, filed on Jun. 2, 2016. The entire disclosures of the above patent applications are hereby incorporated herein by reference.

FIELD OF THE INVENTION

The invention relates to batteries, and more particularly to a battery cover assembly including a vent cap gang which is easily installed and removed.

BACKGROUND OF THE INVENTION

Many devices use a quarter-turn or bayonet-style attachment in applications where quick installation and removal are desired. For example, lead-acid batteries use this method of attachment for securing the vent caps within the vent ports. The same attachment method is often used in the manufacture of battery watering systems to mount the watering valves to the vent ports.

A typical prior art battery cover assembly for a battery includes a battery vent cap and a battery cover having a vent port. The vent cap and the vent port each include a pair of diametrically opposed bayonet tabs. The tabs have substantially similar lead angles. The individual vent cap is manually tightened within the vent port as the vent cap is rotated 90 degrees clockwise (quarter-turn method) by field personnel. This tightening secures the vent cap and provides a seal between a flange of the vent cap and a rim of the vent port. The seal prevents a migration of battery acid out of the battery. The vent cap can be easily rotated 90° counterclockwise by the user to remove the vent cap from the vent port for routine battery maintenance and inspections. The described bayonet attachment system has been used for decades and continues to be a common system of attachment for battery vent caps and watering systems on deep-cycle batteries.

Additionally, a push-in style of cap has also been introduced, particularly for caps which are part of battery watering systems. The push-in style of construction enables the cap to be pushed into place without substantial rotation. The push-in caps are being used on an assembly line by battery manufacturers and manufacturers of battery-powered equipment such as golf cart manufacturers, for example. The caps also enable faster installation of battery watering systems. After the caps are pushed into place, the caps can rotate 360 degrees within the vent port, which is helpful in aligning connection ports on the caps with watering system tubing.

A vent cap gang such as shown and described in U.S. Pat. Appl. Pub. No. 2013/0034756, hereby incorporated herein by reference in its entirety, is employed to easily install and remove multiple vent caps of the above-described types simultaneously. Specifically, the vent cap gang includes a first elongate member and a second elongate member operably coupled to vent caps by first and second pins. An actuator is operably coupled to the elongate members and at least one of the vent caps to cause simultaneous rotation thereof.

However, the position of battery terminals for the batteries may vary between different types of batteries. In certain cases, the elongate members interfere or otherwise collide with the battery terminal posts. Therefore, there is a need for vent cap gangs that accommodate varying positions of battery terminals. In order to accommodate the varying positions of the battery terminals, vent cap gangs with a primary member and a pair of secondary members is often employed. The pair of secondary members each have a length shorter than the primary member and are diagonally disposed relative to each other about the primary member. The shorter translation members do not interfere with the battery terminal posts. An example of a vent cap gang with this configuration is shown and described in U.S. Pat. No. 4,477,542, the disclosure of which is hereby incorporated herein by reference in its entirety.

Disadvantageously, manufacturing and assembly of the vent cap gangs with a primary member and a pair of translation members may be expensive and inefficient. Additionally, vent cap gangs known are not optimally rigid and ergonomically structured. It is important that the vent cap gangs not only seal the vent ports but are also easy to install and remove with minimal effort.

It is an object of the present invention to produce a battery cover assembly including a vent cap gang which is easily installed and removed, wherein a cost and inefficiency of manufacturing and assembly is minimized.

SUMMARY OF THE INVENTION

In concordance and agreement with the present invention, a battery cover assembly including a vent cap gang which is easily installed and removed, wherein a cost and inefficiency of manufacturing and assembly is minimized, has surprisingly been discovered.

According to an embodiment of the disclosure, a battery vent cap gang includes a plurality of vent caps. A primary member is operably coupled to each of the plurality of vent caps. A first translation member is operably coupled to a first one of the plurality of vent caps and spaced from the primary member in a first direction. A second translation member is operably coupled to a second one of the plurality of the vent caps and spaced from the primary member in a second direction. An actuator is operably coupled to the primary member, the first translation member, and the second translation member to cause substantially simultaneous rotational movement of the plurality of vent caps.

According to another embodiment of the disclosure, a battery vent cap gang is disclosed. The battery vent cap includes a plurality of vent caps and a primary member operably coupled to each of the plurality of vent caps. A first translation member is operably coupled to a first one of the plurality of vent caps and spaced from the primary member in a first direction. A second translation member is operably coupled to a second one of the plurality of vent caps and spaced from the primary member in a second direction. The first translation member is diagonally positioned from the second translation member. An actuator is operably coupled to the primary member, the first translation member, and the second translation member to cause substantially simultaneous rotational movement of the vent caps.

BRIEF DESCRIPTION OF THE DRAWINGS

The above objects and advantages of the invention, as well as others, will become readily apparent to those skilled in the art from reading the following detailed description of a preferred embodiment of the invention when considered in the light of the accompanying drawings, in which.

DETAILED DESCRIPTION OF THE PREFERRED EMBODIMENT

Figure 1:
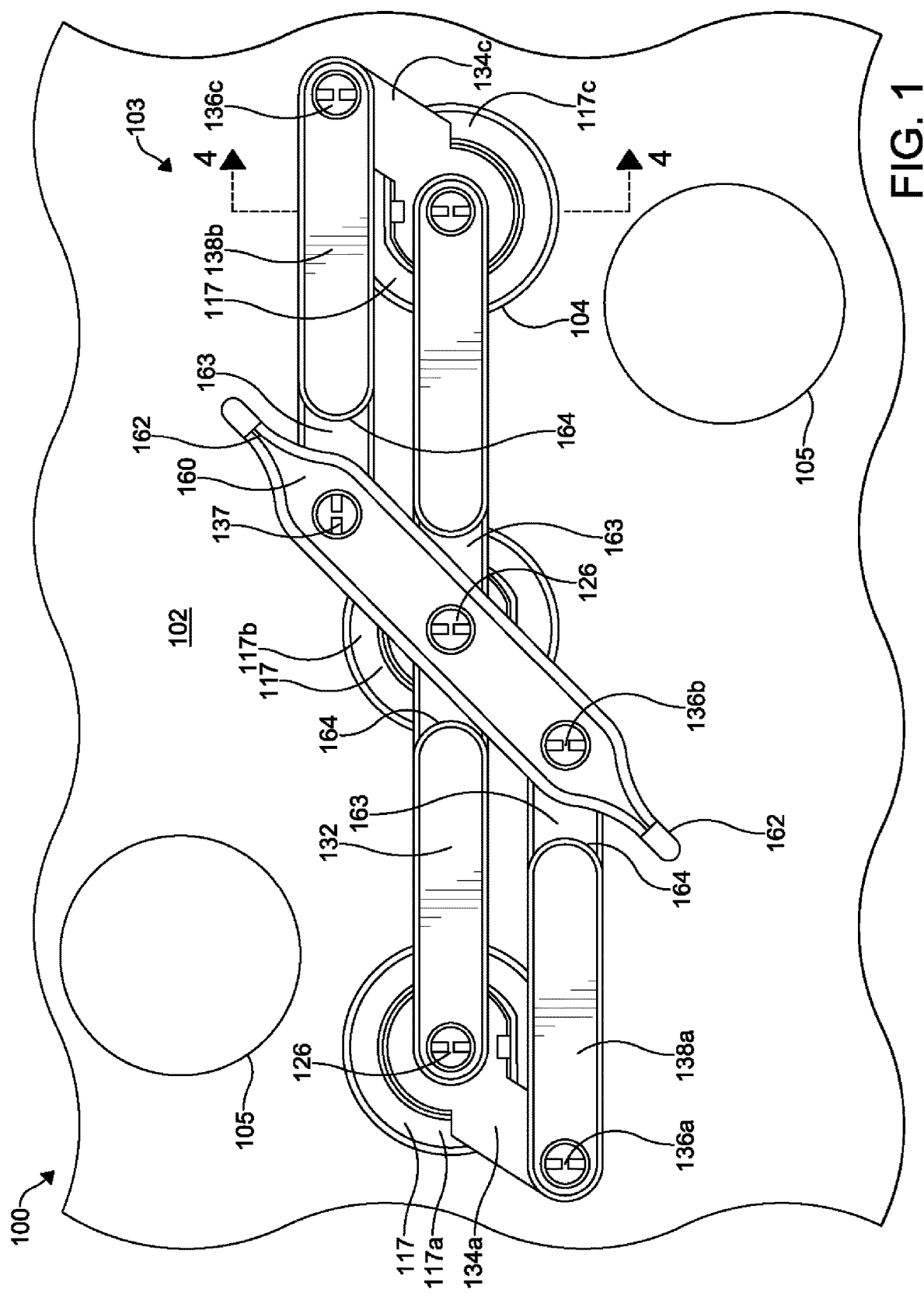
FIG. 1 is a schematic fragmentary top plan view of a battery cover assembly illustrating a vent cap gang with respect to battery terminal posts of a battery cover according to an embodiment of the disclosure.
Figure 2:
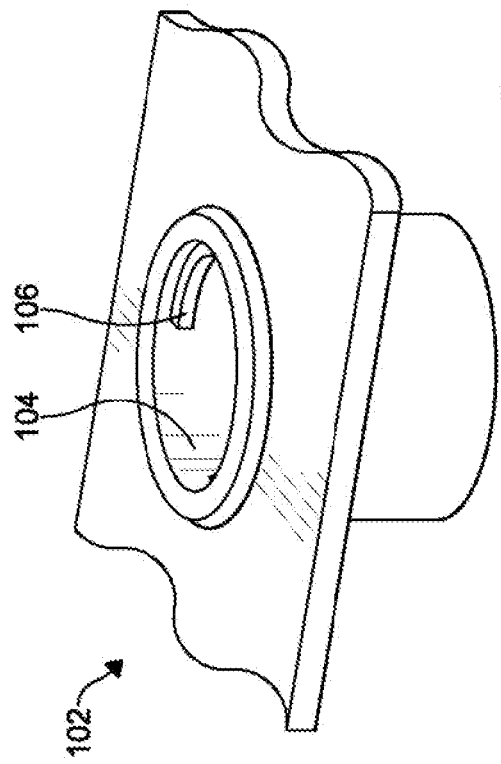
FIG. 2 is a fragmentary top perspective view of a battery cover of the battery cover assembly of FIG. 1, illustrating one of the vent ports of the battery cover.
Figure 3:
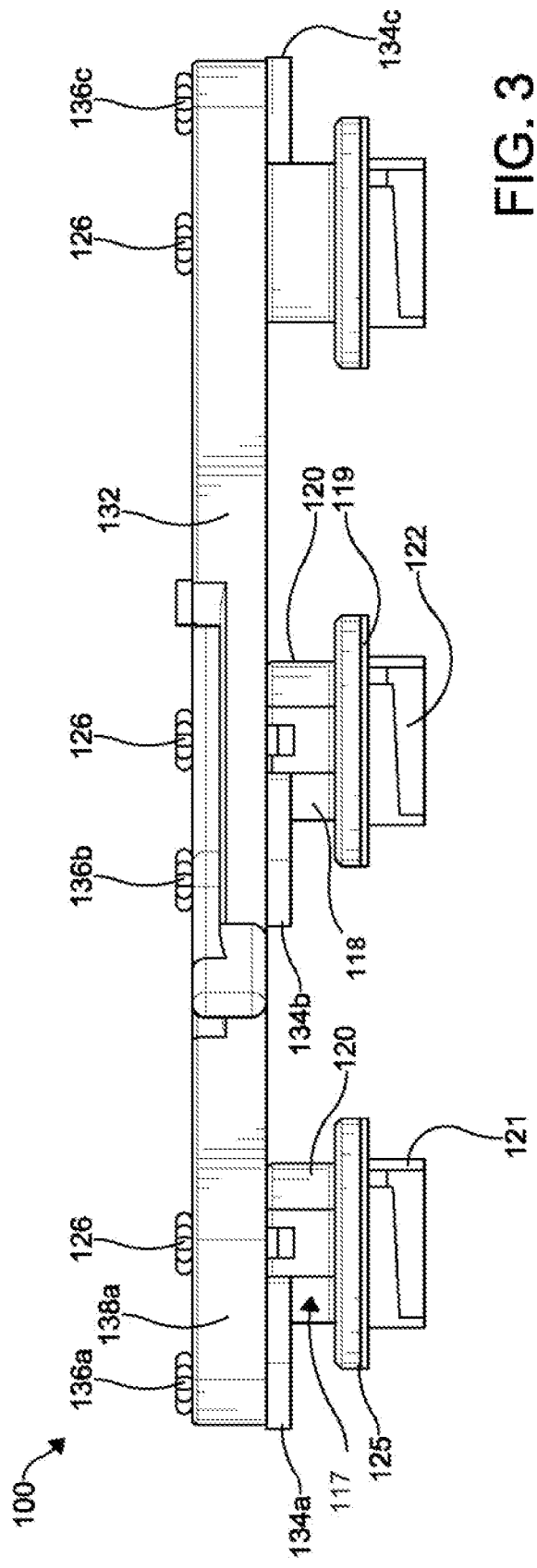
FIG. 3 is a front elevational view of the vent cap gang of FIG. 1.
Figure 4:
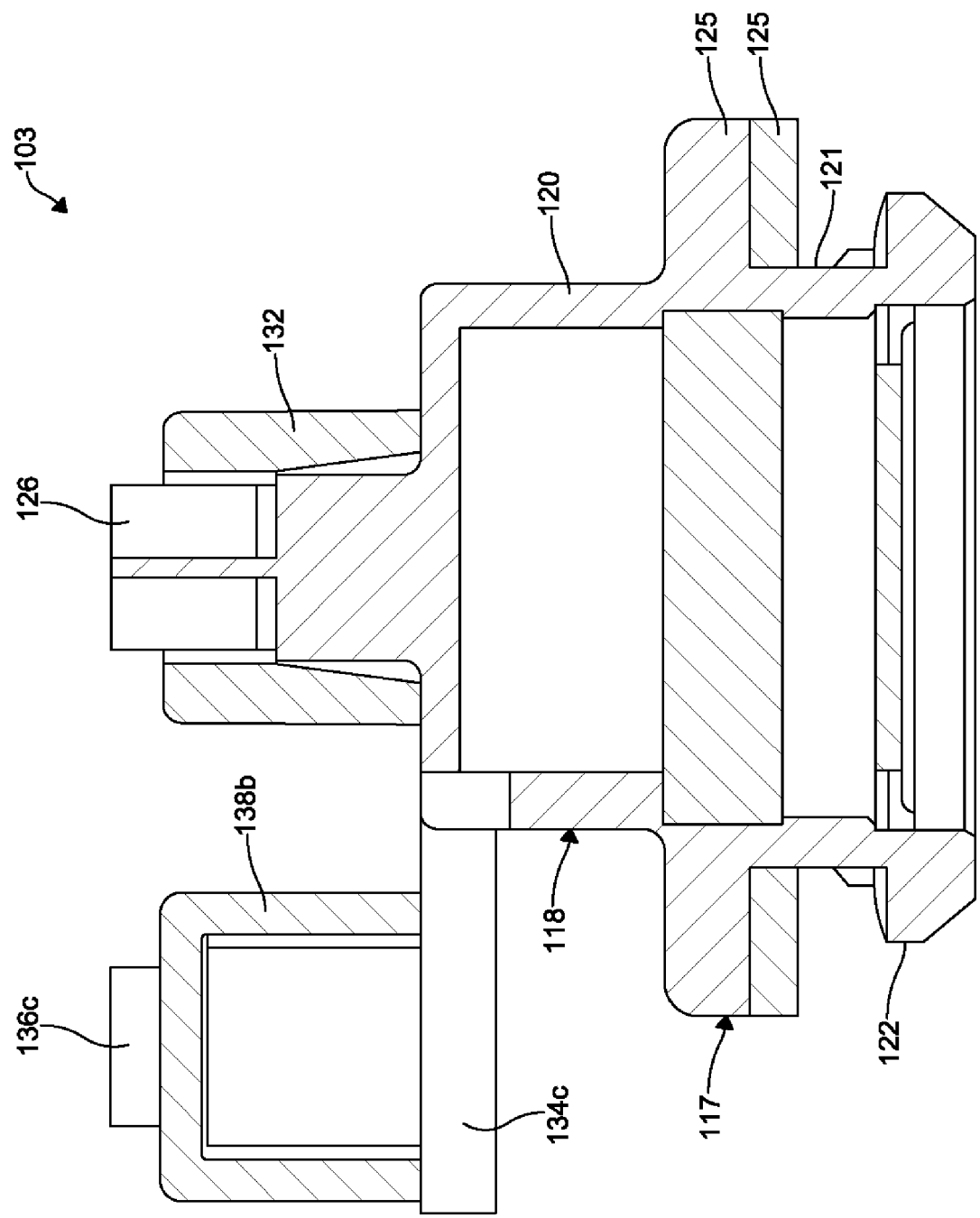
FIG. 4 is a cross-sectional view of the vent cap gang of FIG. 1, taken through the line 4-4.

The following detailed description and appended drawings describe and illustrate various exemplary embodiments of the invention. The description and drawings serve to enable one skilled in the art to make and use the invention, and are not intended to limit the scope of the invention in any manner. As used herein, the term "substantially" means "mostly, but not perfectly" or "approximately" as a person skilled in the art would recognize in view of the specification and drawings. As used herein the term "about" means "reasonably close to" as a person skilled in the art would recognize in view of the specification and drawings.

FIGS. 1-8 illustrate a vent cap gang 103 of a battery cover assembly 100 according to an embodiment of the present invention. The battery cover assembly 100 includes a battery cover 102 and the vent cap gang 103. It is understood that the battery cover 102 can be any suitable battery cover 102 as desired to form a substantially fluid-tight seal with a battery (not shown). The battery cover 102 includes a plurality of spaced apart vent ports 104 formed therein. The vent ports 104 can be formed in the battery cover 102 in any pattern or configuration as desired such as in a diagonal configuration or a linear configuration, for example. The vent ports 104 include a rim and a pair of diametrically opposed, radially inwardly extending bayonet tabs 106. The battery cover 102 may also include other features and components necessary for operation of the battery such as a pair of terminals 105 and a pair of mounting structures (not shown), for example.

The vent cap gang 103 includes a plurality of vent caps 117 (a first vent cap 117a, a second vent cap 117b, and a third vent cap 117c). It is understood that the vent cap gang 103 can include any number of vent caps 117 as desired such as three vent caps 117, as shown, or four vent caps, for example corresponding to the number of the vent ports 104. Each of the vent caps 117 cooperates with the respective vent ports 104 formed in the battery cover 102. Each of the vent caps 117 includes a cylindrical body 118 and a sealing member 119. It is understood that the body 118 can be formed from any suitable material as desired such as a plastic material, for example.

The body 118 includes an upper portion 120 and a lower portion 121. In a non-limiting example, the lower portion 121 of the vent cap 117 has a diameter slightly less than a diameter between the bayonet tabs 106 of the vent ports 104. Each of the lower portions 121 has a pair of diametrically opposed, radially outwardly extending bayonet tabs 122. Intermediate the upper portion 120 and the lower portion 121 of each body 118 is a radially outwardly extending flange 125. A lower surface of the flange 125 is in abutting contact with the sealing member 119 which encircles the lower portion 121.

Each of the upper portions 120 has a first pin 126 extending axially outwardly from a center with respect to a rotational axis thereof. The first pins 126 operably couple the vent caps 117 to an elongate primary member 132. Each of the first pins 126 includes a cylindrical section having an enlarged end. A configuration of the enlarged end, wherein the enlarged end has slots formed therein, permits the enlarged end of the first pins 126 to be inserted into a respective aperture formed in the primary member 132. The slots permit a compression of the enlarged end through the respective aperture of the primary member 132 to engage the primary member 132 to each of the vent caps 117. A diameter of each of the apertures of the primary member 132 is slightly smaller than a diameter of each of the enlarged ends of the first pins 126.

Each of the vent caps 117 includes a radially outwardly extending arm 134 (a first arm 134a extending from the first vent cap 117a, a second arm 134b extending from the second vent cap 117b, and a third arm 134c extending from the third vent cap 177c). Each of the arms 134 includes a second pin 136b extending laterally outwardly from a distal end thereof.

The upper portion 120 of the first vent cap 117a includes the radially outwardly extending first arm 134a having a second pin 136a extending laterally outwardly from a distal end thereof. As shown, the second pin 136a is offset in respect of a center of the body 118 of the first vent cap 117a and spaced from the first vent cap 117a. The second pin 136a operably couples the first vent cap 117a to a first translation member 138a at a first end of the first translation member 138a. The first translation member 138a is substantially parallel to and laterally offset in a first direction from the primary member 132 prior to and after an installation of the vent cap gang 103 into the battery cover 102. The second pin 136a includes a cylindrical section having an enlarged end. A configuration of the enlarged end, wherein the enlarged end has slots formed therein, permits the enlarged end of the second pin 136a to be inserted into a respective aperture formed in the first end of the first translation member 138a. The slots permit a compression of the enlarged end through the respective aperture of the first translation member 138a to engage the first translation member 138a to the first vent cap 117a. A diameter of the aperture of the first translation member 138a is slightly smaller than a diameter of the enlarged end of the second pin 136a.

The upper portion 120 of the second vent cap 117b includes a radially outwardly extending second arm 134b having a second pin 136b extending laterally outwardly from a distal end thereof. The second arm 134b extends from the second vent cap 117b in a direction parallel to a direction of the first arm 134a. As shown, the second pin 136b of the second vent cap 117b is offset in respect of a center of the body 118 of the second vent cap 117b and is spaced from the second vent cap 117b. The second pin 136b operably couples the second vent cap 117b to the first translation member 138a at a second end thereof. The second pin 136b of the second vent cap 117b includes a cylindrical section having an enlarged end. A configuration of the enlarged end, wherein the enlarged end has slots formed therein, permits the enlarged end of the second pin 136b to be inserted into a respective aperture formed in the second end of the first translation member 138a. The slots permit a compression of the enlarged end through the respective aperture of the first translation member 138a to engage the first translation member 138a to the second vent cap 117b. A diameter of the aperture of the first translation member 138a is slightly smaller than a diameter of the enlarged end of the second pin 136b of the second vent cap 117b.

The upper portion 120 of the third vent cap 117c includes a radially outwardly extending third arm 134c having a second pin 136c extending laterally outwardly from a distal end thereof. The third arm 134c extends in a direction opposite the direction of the first arm 134a and the second arm 134b. As shown, the second pin 136c of the third vent cap 117c is offset in respect of a center of the body 118 of the third vent cap 117c and spaced from the third vent cap 117c. The second pin 136c operably couples the third vent cap 117c to a first end of a second translation member 138b. The second translation member 138b is substantially parallel to and laterally offset in a second direction, opposite the first direction, from the primary member 132 prior to and after an installation of the vent cap gang 103 into the battery cover 102.

As illustrated, the second vent cap 117b is also operably coupled to at least one actuator 160 by the first pin 126 of the second vent cap 117b and the second pin 136b of the second arm 134b. The actuator 160 is operably coupled to the second translation member 138b by a connecting pin 137 formed on a second end of the second translation member 138b. The actuator 160 shown includes axially opposed grips 162. In a non-limiting example, the actuator 160 is received in an indentation 163 formed in a top portion of each of the primary member 132 and the translation members 138a, 138b. The indentation 163 formed in the primary member 132 is formed in a substantially central portion of the primary member 132 with respect to a lengthwise direction thereof. The indentations 163 formed in each of the translation members 138a, 138b are formed in the second ends of each of the translation members 138a, 138b. Although, it is understood, the indentations 163 can be formed at any portion of the respective primary member 132 and translation members 138a, 138b, as desired. Shoulder portions 164 of the members 132, 138a, 138b defining the indentations 163 are configured as end stops during a pivoting of the actuator 160. It is understood that the vent cap gang 103 may further include at least one locking feature such as a protuberance, a detent, or the like, for example, which maintains a position of the vent cap gang 103 prior to the installation thereof into the battery cover 102.

Figure 5:
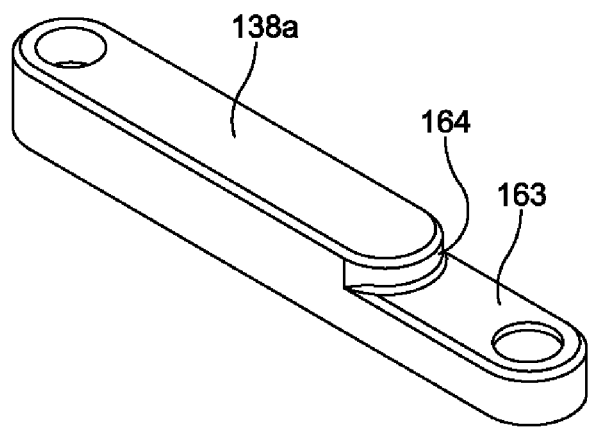
FIG. 5 is a top perspective view of a first translation member of the vent cap gang of FIG. 1.
Figure 6:
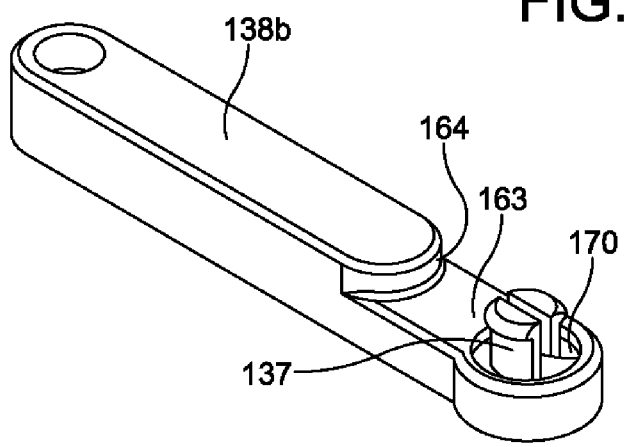
FIG. 6 is a top perspective view of a second translation member of the vent cap gang of FIG. 1.
Figure 7:
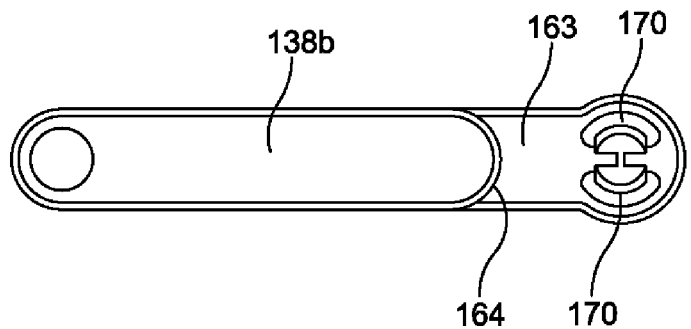
FIG. 7 is a top plan view of the second translation member of FIG. 6.
Figure 8:
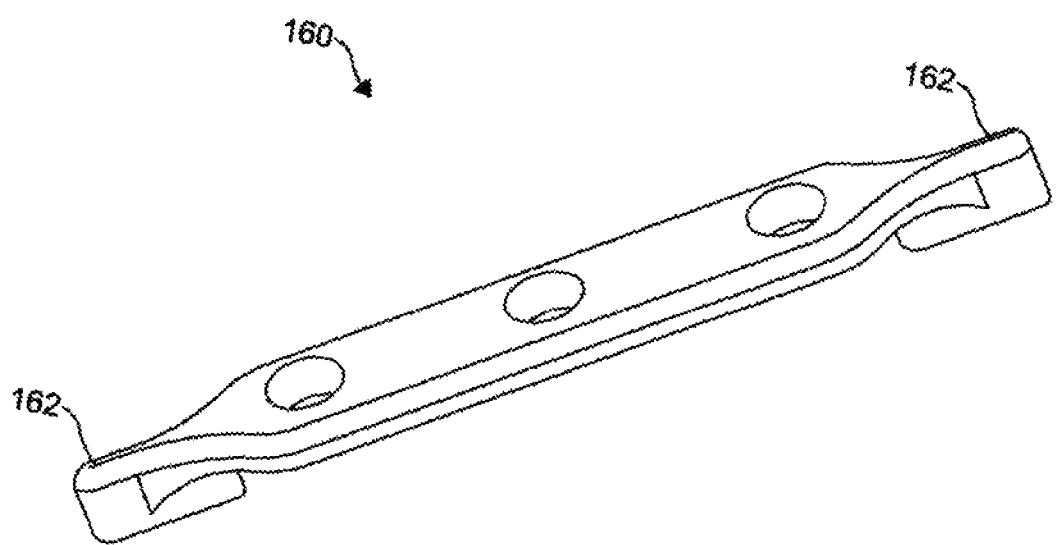
FIG. 8 is a top perspective view of an actuator of the vent cap gang of FIG. 1.

The translation members 138a, 138b are diagonally positioned with respect to each other. Each of the translation members 138a, 138b has a length smaller than a length of the primary member 132. As shown in FIGS. 5-7, the translation members 138a, 138b are substantially similar to each other, except the second translation member 138b includes the connecting pin 137 formed thereon. Advantageously, the connecting pin 137 is formed on the second translation member 138b so the second vent cap 117b is not required to include an additional arm, beyond the second arm 134b, extending radially outwardly from the second vent cap 117b. Consequently, because each of the vent caps 117 are similar, each of the vent caps 117 can be manufactured by the same process.

The second translation member 138b includes a pair of windows 170 having an arcuate shape laterally formed adjacent the connecting pin 137. During manufacturing, the windows 170 militate against the use of molding slides, which minimizes manufacturing costs.

When installation of the vent cap gang 103 within the battery cover is desired, the vent caps 117 of the vent cap gang 103 are aligned with the vent ports 104 of the battery cover 102. More particularly, the tabs 122 of each of the vent caps 117 are offset from the bayonet tabs 106 of each of the vent ports 104. In certain embodiments, the locking feature militates against an undesired movement of the actuator 160, the translation members 138a, 138b, and hence, the vent caps 117 after an assembly of the vent cap gang 103. Accordingly, the tabs 122 of each of the vent caps 117 are offset from the bayonet tabs 106 of each of the vent ports 104 without requiring additional adjustment by field personnel.

The lower portion 121 of each body 118 of the vent caps 117 is substantially simultaneously urged downward into each of the vent ports 104 having the tabs 122 thereof disposed between the bayonet tabs 106 of the vent ports 104. Once the body 118 of each of the vent caps 117 is inserted into the vent ports 104, the tabs 122 are located below the bayonet tabs 106 of the vent ports 104. A force is then applied against the grips 162 of the actuator 160 to cause a pivotal movement thereof. In certain embodiments, the force applied to the grips 162 of the actuator 160 is such to overcome a resistance force of the locking feature. The pivotal movement of the actuator 160 causes a lateral movement of the translation members 138a, 138b, which in turn causes substantially simultaneous rotational movement of the vent caps 117. In the embodiment shown, the first translation member 138a translates in a direction towards the third vent cap 117c and the second translation member 138b translates in a direction towards the first vent cap 117a until pivotal movement of the actuator 160 is stopped by the shoulders 164 of the primary member 132. As a non-limiting example, the vent caps 117 are rotated up to about 90 degrees in a first direction or a clockwise direction. It is understood, however, that the vent cap gang 103 can be configured wherein the pivotal movement of the actuator 160 causes the vent caps 117 to rotate in the first direction in a counter-clockwise direction. The rotational movement of the vent caps 117 causes a substantially simultaneous rotational movement of the tabs 122 of the vent caps 117 and an engagement of the tabs 122 with the bayonet tabs 106 of the vent ports 104. As the tabs 122 of the vent caps 117 and the tabs 106 of the vent ports 104 are engaged, the vent cap gang 103 is secured in the battery cover 102. When the vent cap gang 103 is secured and in the engaged position, each sealing member 119 is compressed between the flange 125 of the vent cap 117 and the rim of the vent ports 104 to form a substantially fluid-tight seal.

When removal of the vent cap gang 103 from the vent ports 104 is desired such as for battery maintenance or service, for example, the vent cap gang 103 is disengaged from the vent ports 104. More particularly, a force is applied against the grips 162 of the actuator 160 in a counter-clockwise or second direction, causing a pivotal movement of the actuator 160 and a substantially simultaneous rotational movement of the vent caps 117. As a non-limiting example, the vent caps 117 are rotated up to about 90 degrees in the clockwise direction. It is understood, however, that the vent cap gang 103 can be configured such that the pivotal movement of the actuator 160 causes the vent caps 117 to rotate in the second direction in the counter-clockwise direction. The rotational movement of the vent caps 117 causes a substantially simultaneous rotational movement of the tabs 122 of the vent caps 117 and a disengagement of the tabs 122 from the bayonet tabs 106 of the vent ports 104. As the tabs 122 of the vent caps 117 and the tabs 106 of the vent ports 104 are disengaged, the vent cap gang 103 is released from the battery cover 102. Once released, the vent cap gang 103 can be removed from the battery cover 102 by an axial movement thereof.

In another embodiment, the bayonet tabs 122 can be configured for push-in style installation. When installation of the vent cap gang 103 within the battery cover 102 is desired, the vent caps 117 of the vent cap gang 103 are aligned with the vent ports 104 of the battery cover 102. More particularly, the bayonet tabs 122 of each of the vent caps 117 are aligned with the respective bayonet tabs 106 of each of the vent ports 104. In certain embodiments, the locking feature militates against an undesired movement of the actuator 160, the translation members 138a, 138b and hence, the vent caps 117 after an assembly of the vent cap gang 103. Accordingly, the bayonet tabs 122 of each of the vent caps 117 are aligned with the respective bayonet tabs 106 of each of the vent ports 104 without requiring additional adjustment by field personnel.

The lower portion 121 of each body 118 of the vent caps 117 is substantially simultaneously urged downward into the vent ports 104 by the members 132, 138a, 138b without rotational movement thereof. As the body 118 of each of the vent caps 117 is inserted into the vent ports 104, the bayonet tabs 122 of the vent caps 117 slidingly contact the bayonet tabs 106 of the vent ports 104. The vent cap gang 103 is urged downward until the bayonet tabs 122 are positioned under a lower surface of the bayonet tabs 106 of the vent ports 104 to secure the vent cap gang 103 in the battery cover 102 without rotational movement thereof. When the vent cap gang 103 is secured and in an engaged position, each sealing member 119 is compressed between the flange 125 of the vent cap 117 and the rim of the vent port 104 to form a substantially fluid-tight seal.

When removal of the vent cap gang 103 from the vent ports 104 is desired such as for battery maintenance or service, for example, the vent cap gang 103 is disengaged from the vent ports 104. More particularly, a force is applied to the grips 162 of the actuator 160, causing a pivotal movement thereof. In certain embodiments, the force applied to the grips 162 of the actuator 160 is such that as to overcome a resistance force of the locking feature 166. The pivotal movement of the actuator 160 causes a lateral movement of the translation members 138a, 138b, which in turn causes substantially simultaneous rotational movement of the vent caps 117. As a non-limiting example, the vent caps 117 are rotated up to about 90 degrees in a counter-clockwise direction. It is understood, however, that the vent cap gang 103 can be configured such that the pivotal movement of the actuator 160 causes the vent caps 117 to rotate in a clockwise direction. As the vent caps 117 rotate, the bayonet tabs 122 of the vent caps 117 slidingly contact, and ultimately disengage, the bayonet tabs 106 of the vent ports 104. Once the bayonet tabs 122 are disengaged, the vent cap gang 103 is removed from the vent ports 104 by an axial movement thereof.

Advantageously, the vent cap gang 103 of the present disclosure are efficient and ergonomically structured, while minimizing manufacturing costs. The configuration of the primary member 132 with respect to the translation members 138a, 138b permits the vent cap gang 103 to be installed and coupled to pre-existing battery covers 102 while avoiding a disturbance or contact with a battery terminal post.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A battery vent cap gang comprising:
   a plurality of vent caps;
   a primary member coupled to each of the plurality of vent caps;
   a first translation member operably coupled to a first one of the plurality of vent caps and a second one of the plurality of vent caps, the first translation member spaced from the primary member on a first side of the primary member;
   a second translation member operably coupled to a third one of the plurality of member on a second side of the primary member; and
   an actuator pivotally coupled to the first translation member and the second translation member and rotatingly coupled with the primary member to cause substantially simultaneous rotational movement of the plurality of vent caps, an entirety of the first translation member extending between the first one of the plurality of vent caps and the actuator, and an entirety of the second translation member extending between the actuator and the third one of the plurality of vent caps, wherein both the first translation member and the second translation member have a length less than a length of the primary member, wherein an indentation is formed in an upper surface of an end of both the first translation member and the second translation member, wherein the actuator is an elongate member extending between the first translation member and the second translation member and is received in the indentation formed in both the first translation member and the second translation member, and wherein a positioning of the actuator in the indentation formed in both the first translation member and the second translation member prevents an over-pivoting of the actuator.

2. The battery vent cap gang of claim 1, wherein the primary member is coupled to each of the plurality of vent caps at an axial center of each of the plurality of vent caps.

3. The battery vent cap gang of claim 1, wherein the primary member is coupled to each of the plurality of vent caps by a first pin at the axial center of each of the plurality of vent caps.

4. The battery vent cap gang of claim 3, wherein each of the plurality of vent caps includes a second pin offset from the axial center thereof.

5. The battery vent cap gang of claim 4, wherein the first translation member is coupled to the second pin of the first one of the plurality of vent caps and the second pin of the second one of the plurality of vent caps.

6. The battery vent cap gang of claim 1, wherein the first one of the plurality of vent caps and the second one of the plurality of vent caps are directly adjacent each other.

7. The battery vent cap gang of claim 6, wherein the second one of the plurality of vent caps is directly intermediate the first one of the plurality of vent caps and the third one of the plurality of vent caps.

8. The battery vent cap gang of claim 1, wherein the second translation member has a connecting pin formed thereon, the connecting pin coupling the actuator to the second translation member.

9. The battery vent cap gang of claim 1, wherein the first translation member is diagonally offset from the second translation member.

10. The battery vent cap gang of claim 1, wherein each of the plurality of vent caps includes a radially outwardly extending arm coupling one of the first translation member and the second translation member to a respective one of the plurality of vent caps.

11. The battery vent cap gang of claim 10, wherein the radially outwardly extending arm of the first one of the plurality of vent caps couples the first translation member to the first one of the plurality of vent caps and the radially outwardly extending arm of the second one of the plurality of vent caps couples the first translation member to the second one of the plurality of vent caps, and wherein the radially outwardly extending arm of the third one of the plurality vent caps couples the second translation member to the third one of the plurality of vent caps.

12. The battery vent cap gang of claim 10, wherein the radially outwardly extending arms of each of the first one of the plurality of vent caps and the second one of the plurality of vent caps extend from the respective ones of the plurality of vent caps in a first direction and the radially outwardly extending arm of the third one of the plurality of vent caps extends from the third one of the plurality of vent caps in a second direction, wherein the first direction is opposite the second direction.

13. The battery vent cap gang of claim 1, wherein the actuator includes axially opposed grips formed thereon.

14. A battery vent cap gang comprising:
a first vent cap;
a second vent cap;
a third vent cap, the second vent cap disposed intermediate the first vent cap and the second vent cap;
a primary member coupled to an axial center of each of the first vent cap, the second vent cap, and the third vent cap by a first pin;
a first translation member operably coupled to the first vent cap and the second vent cap, the first translation member having a pair of apertures each disposed at opposite ends of the first translation member, the first one of the pair of apertures receiving a second pin of the first vent cap and the second one of the pair of apertures receiving a second pin of the second vent cap;
a second translation member operably coupled to a third one of the plurality of vent caps, the second translation member having a second translation aperture formed at a first end thereof and a connecting pin formed at an opposite second end thereof, the second translation aperture receiving a second pin of the third vent cap; and
an actuator pivotally coupled to the first translation member by the second pin of the second vent cap and the second translation member by the connecting pin, the actuator rotatingly coupled to the primary member by the first pin of the second vent cap, wherein both the first translation member and the second translation member has a length less than a length of the primary member, wherein an indentation is formed in an upper surface of an end of both the first translation member and the second translation member, and wherein the actuator is an elongate member extending between the first translation member and the second translation member and is received in the indentation formed in both the first translation member and the second translation member, and wherein a positioning of the actuator in the indentation formed in both the first translation member and the second translation member prevents an over-pivoting of the actuator.

15. The battery vent cap gang of claim 14, wherein the first translation member is disposed intermediate the second vent cap and the actuator and the second translation member directly engages the actuator.

16. The battery vent cap gang of claim 14, wherein the connecting pin is integrally formed with the second translation member and extending from the upper surface of the second translation member.

17. The battery vent cap gang of claim 14, wherein the second pin of each of the first vent cap, the second vent cap, and the third vent cap extend from a radially outwardly extending arm, the radially outwardly extending arm of the first vent cap and the second vent cap extend in a direction opposite the radially outwardly extending arm of the third vent cap.

* * * * *

UNITED STATES PATENT AND TRADEMARK OFFICE
CERTIFICATE OF CORRECTION

PATENT NO. : 11,817,598 B2  
APPLICATION NO. : 17/176716  
DATED : November 14, 2023  
INVENTOR(S) : Michael A. Doyle Page 1 of 1

It is certified that error appears in the above-identified patent and that said Letters Patent is hereby corrected as shown below:

In the Claims

Claim 1, Column 8, Line 14, after "plurality of" and before "member" insert -- vent caps, the second translation member spaced from the primary --

Signed and Sealed this  
Third Day of June, 2025

Coke Morgan Stewart  
*Acting Director of the United States Patent and Trademark Office*